(12) United States Patent
Lee et al.

(10) Patent No.: US 7,366,549 B2
(45) Date of Patent: Apr. 29, 2008

(54) INTEGRATED MOBILE TERMINAL DEVICE AND METHOD FOR CONTROLLING EXTERNAL DISPLAY UNIT

(75) Inventors: Kyu-Chul Lee, Seoul (KR); Won-Sik Lee, Songnam-shi (KR)

(73) Assignee: Samsung Electronics Co., Ltd. (KR)

(*) Notice: Subject to any disclaimer, the term of this patent is extended or adjusted under 35 U.S.C. 154(b) by 181 days.

(21) Appl. No.: 10/771,490

(22) Filed: Feb. 4, 2004

(65) Prior Publication Data
US 2004/0157642 A1  Aug. 12, 2004

(30) Foreign Application Priority Data
Feb. 4, 2003  (KR) .................. 10-2003-0006866

(51) Int. Cl.
H04B 1/38 (2006.01)
H04M 1/00 (2006.01)
(52) U.S. Cl. .................. 455/574; 455/556.2; 455/566; 455/343.1; 713/320; 713/310; 340/7.32
(58) Field of Classification Search ............ 455/556.2, 455/556.1, 574, 343.1, 343.3, 566; 340/7.1, 340/7.32; 713/320, 310
See application file for complete search history.

(56) References Cited

U.S. PATENT DOCUMENTS

| 5,487,181 | A | * | 1/1996 | Dailey et al. ............. 455/90.2 |
| 5,842,141 | A | * | 11/1998 | Vaihoja et al. ............. 455/574 |
| 5,881,299 | A | | 3/1999 | Nomura et al. |
| 6,473,607 | B1 | * | 10/2002 | Shohara et al. .......... 455/343.1 |
| 6,725,060 | B1 | * | 4/2004 | Chhatriwala et al. .... 455/556.2 |
| 6,813,503 | B1 | * | 11/2004 | Zillikens et al. ............ 455/457 |
| 7,058,427 | B2 | * | 6/2006 | Villaret ....................... 455/566 |
| 2002/0037754 | A1 | | 3/2002 | Hama et al. |
| 2004/0059852 | A1 | * | 3/2004 | Sun et al. ................... 710/110 |

FOREIGN PATENT DOCUMENTS

EP   1 263 191   12/2002

* cited by examiner

*Primary Examiner*—Lester G. Kincaid
*Assistant Examiner*—Dung Lam
(74) *Attorney, Agent, or Firm*—The Farrell Law Firm, PC

(57) ABSTRACT

An integrated mobile terminal device including an external display unit, a personal digital assistant (PDA) unit and a cellular phone unit combined with one another, and a timer controlled by either the PDA unit or the cellular phone unit for enabling the PDA unit at given time intervals is provided. The cellular phone unit controls the external display unit in an enabled state, directs the PDA unit to control the external display unit when the cellular phone unit is switched off and the cellular phone unit detects the PDA unit to be in an enabled state, and transitions to an off state after activating the timer when the PDA unit is in a disabled state. The PDA unit determines whether the cellular phone unit is in the off state when the PDA unit transitions to the enabled state, and transitions to the disabled state after activating the timer when disabled.

10 Claims, 3 Drawing Sheets

INTEGRATED MOBILE TERMINAL DEVICE AND METHOD FOR CONTROLLING EXTERNAL DISPLAY UNIT

PRIORITY

This application claims priority under 35 U.S.C. § 119 to an application entitled "Integrated Mobile Terminal Device and Method for Controlling External Display Unit" filed in the Korean Industrial Property Office on Feb. 4, 2003 and assigned Serial No. 2003-6866, the contents of which are incorporated herein by reference.

BACKGROUND OF THE INVENTION

1. Field of the Invention

The present invention relates generally to an integrated mobile terminal device with an external display unit, and in particular, to an integrated mobile terminal device and method for controlling an external display unit.

2. Description of the Related Art

In general, an integrated mobile terminal device (also known as a "smart phone") is comprised of a cellular phone part for performing a communication function and a personal digital assistant (PDA) part for performing a computing function.

FIG. 1 schematically illustrates a functional block diagram of a general integrated mobile terminal device. Referring to FIG. 1, the integrated mobile terminal device includes a display unit 1 for displaying the operating status of the integrated mobile terminal device, a PDA unit 2 for performing a general PDA function, a cellular phone unit 3 for carrying out a wireless communication function, and a power supply 4 for supplying an operational power source to each unit. A key entry unit, a speaker, a microphone, and the like contained generally in the integrated mobile terminal device are not shown in FIG. 1, for simplicity. The integrated mobile terminal device having the above-stated construction provides various services to users by performing both a PDA function and a cellular phone function in one device. In addition, the integrated mobile terminal device has a function of selectively switching off the PDA unit and the cellular phone unit in order to save its power.

The integrated mobile terminal device is generally divided into a bar-type and a flip-type according to its appearance. The folder-type integrated mobile terminal device with an external display unit has been developed in order to meet user's various needs. The folder-type integrated mobile terminal device includes a body, a folder, and a hinge module for mechanically connecting the body with the folder. On the external display unit is displayed display information to be frequently checked, such as an icon designating an antenna state bar, an icon designating the remaining amount of charge in a battery, and time data in a state where the folder of the integrated mobile terminal device is closed.

In controlling the external display unit of the integrated mobile terminal device, however, if either the PDA unit or the cellular phone unit, which is fully in charge of the external display unit, is switched off, the external display unit will be disabled. Moreover, if the PDA unit or the cellular phone unit is continuously in an enabled state to use the external display unit, unnecessary battery power is consumed.

SUMMARY OF THE INVENTION

It is, therefore, an object of the present invention to provide an integrated mobile terminal device and method for controlling an external display unit irrespective of an enabled state of a PDA unit or a cellular phone unit in an integrated mobile terminal device having the external display unit.

In accordance with one aspect of the invention, there is provided an integrated mobile terminal device including an external display unit, and a personal digital assistant (PDA) unit and a cellular phone unit combined with one another. The integrated mobile terminal device comprises a timer controlled by either the PDA unit or the cellular phone unit, for enabling the PDA unit at given time intervals. The cellular phone unit controls the external display unit in an enabled state, determines whether the PDA unit is in an enabled state when the cellular phone unit is switched off, directs the PDA unit to control the external display unit when the PDA is in the enabled state, and transitions to an off state after activating the timer when the PDA unit is in a disabled state. The PDA unit controls the external display unit in response to a control command from the cellular phone unit, determines whether the cellular phone unit is in the off state when the PDA unit transitions to the enabled state from the disabled state, controls the external display unit when the cellular phone unit is in the off state, and transitions to the disabled state after activating the timer when the PDA unit is disabled.

In accordance with another aspect of the present invention, there is provided a method for controlling an external display unit in an integrated mobile terminal device including the external display unit, and a personal digital assistant (PDA) unit and a cellular phone unit combined with one another. The method comprising the steps of: controlling the external display unit when the cellular phone unit is enabled; determining whether the PDA unit is in an enabled state when the cellular phone unit is switched off; if the PDA unit is in a disabled state, activating, by the cellular phone unit, a timer for enabling the PDA unit at given time intervals, and transitioning to an off state; and if the PDA unit is in the enabled state, directing, by the cellular phone unit, the PDA unit to control the external display unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the attached drawings. In the following description, a detailed description of known functions and configurations incorporated herein has been omitted for conciseness.

Figure 1:
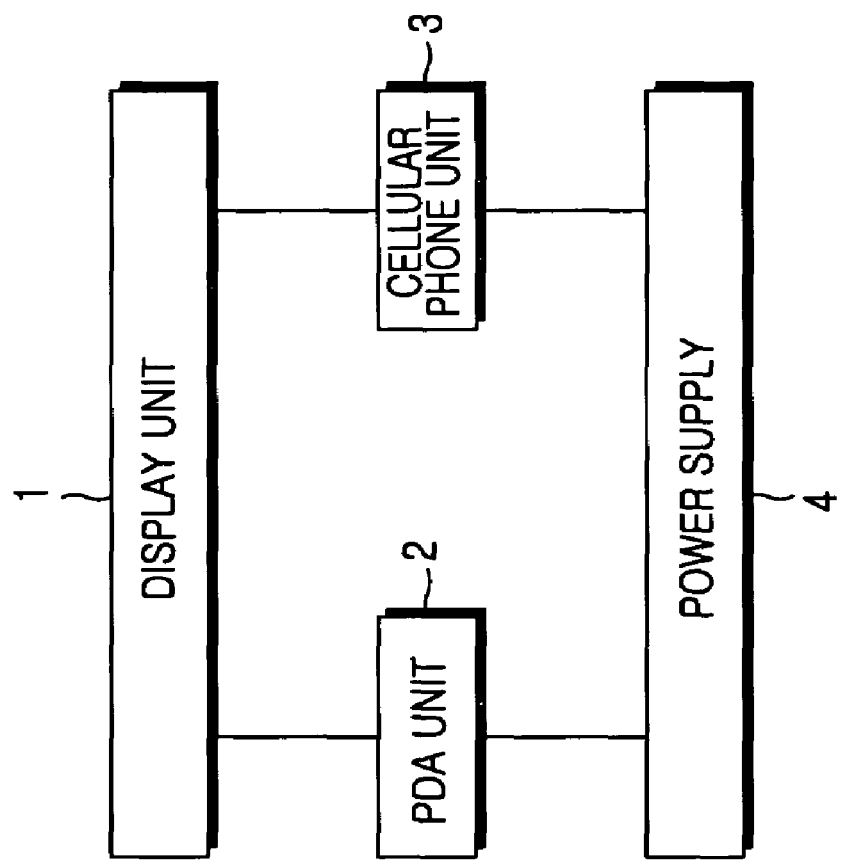
FIG. 1 is a functional block diagram schematically illustrating a general integrated mobile terminal device.
Figure 2:
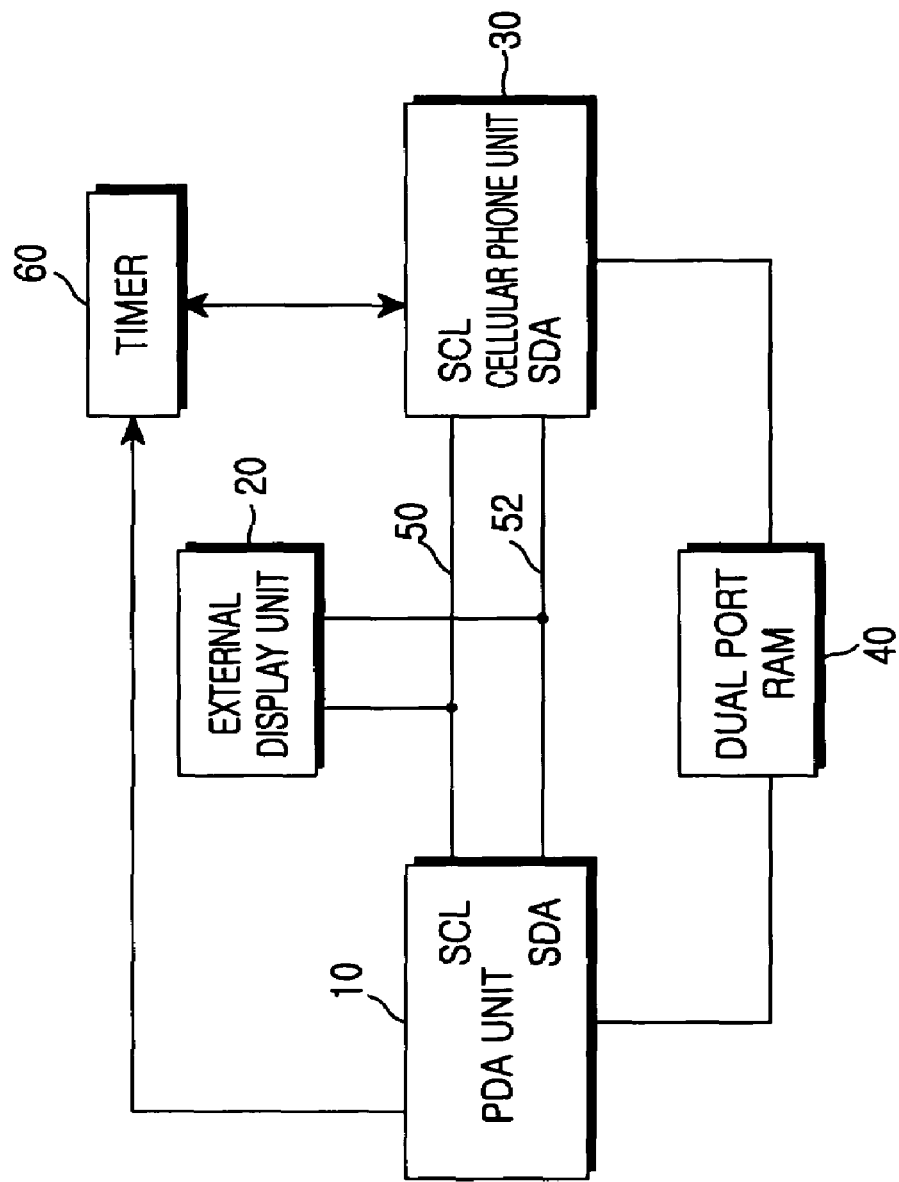
FIG. 2 is a functional block diagram of an integrated mobile terminal device according to a preferred embodiment of the present invention.

Referring to FIG. 2, an integrated mobile terminal device according to a preferred embodiment of the present invention includes a PDA unit 10 for controlling a PDA function, and a cellular phone unit 30 for controlling a cellular phone function. The integrated mobile terminal device generally achieves the cellular phone function on the basis of the PDA function. Therefore, the cellular phone unit 30 for the cellular phone function has an enabled/off state, whereas the PDA unit 10 has an enabled/disabled state and an off state. That is, the PDA unit 10 has the enabled/disabled state unless the integrated mobile terminal device is switched off. However, the cellular phone unit 30 can be in the off state even though the integrated mobile terminal device is not switched off.

The PDA unit 10 and the cellular phone unit 30 are connected to each other by an I2C bus. As is known in the art, the I2C bus is a synchronous bidirectional 2-wire bus using two lines of a clock line (SCL) 50 and a data line (SDA) 52. The PDA unit 10 and the cellular phone unit 30 connected by the I2C bus have unique addresses and operate as a receiver and a transmitter, when necessary. This I2C bus is connected to an external display unit 20 to allow the PDA unit 10 and the cellular phone unit 30 to provide display information.

The integrated mobile terminal device includes the external display unit 20 according to the preferred embodiment of the present invention. On the external display unit 20 are displayed, for example, an antenna state bar of the cellular phone unit 30, the remaining amount of charge in a battery of the integrated mobile terminal device, and time information. In addition, for example, an SMS (Short Message Service) message from the cellular phone unit 30, and a calling number may also be displayed on the external display unit 20. According to the preferred embodiment of the present invention, the external display unit 20 is controlled by either the PDA unit 10 or the cellular phone unit 30. If both the PDA unit 10 and the cellular phone unit 30 are switched off or disabled, the external display unit 20 is intermittently controlled by the PDA unit 10.

The cellular phone unit 30 controls an operation of carrying out call origination and call termination functions of a general mobile terminal. The cellular phone unit 30 also controls the external display unit 20 in the enabled state. In other words, the cellular phone unit 30 is initialized to control the external display unit 20 each time it is enabled. The cellular phone unit 30 controls the external display unit 20 to display, for example, the antenna state bar, the remaining amount of charge in the battery of the integrated mobile terminal device, the time information, the SMS message, and the calling number. The cellular phone unit 30 can be switched off by a user or on a prescribed condition. In this case, the cellular phone unit 30 determines whether the PDA unit 10 is in an enabled state. If the PDA unit 10 is in the enabled state, the cellular phone unit 30 is switched off after directing the PDA unit 10 to control the external display unit 20. If the PDA unit 10 is in a disabled state, the cellular phone unit 30 is switched off after activating a timer 60. When the timer 60 enables the PDA unit 10 at prescribed time intervals, the PDA unit 10 controls the external display unit 20 to display the display information and returns to the disabled state.

The PDA unit 10 controls an operation of performing the PDA function. Besides, the PDA unit 10 controls the external display unit 20 in response to a control command from the cellular phone unit 10. In this case, time information is given by the cellular phone unit 30, and the PDA unit 10 synchronizes the time information with time information to be displayed on the external display unit 20. This is because the time information of the PDA unit 20 may be different from the time information that has been displayed on the external display unit 20 by the cellular phone unit 30. The PDA unit 10 is disabled, for example, when in a dormant state or when a folder of the integrated mobile terminal device is closed. If the PDA unit 10 transitions to the enabled state from the disabled state, it determines whether the cellular phone unit 30 is in an off state. If the cellular phone unit 30 is in the off state, the PDA unit 10 controls the external display unit 20 to display, for example, the remaining amount of charge in the battery of the integrated mobile terminal device, the time information, and alarm information.

The PDA unit 10 can be disabled by a user or on a prescribed condition. In this case, if the cellular phone unit 30 is in the off state, the PDA unit 30 is disabled after activating the timer 60. The timer 60 then enables the PDA unit 10 at given time intervals. Therefore, the PDA unit 10 controls the external display unit 20 to display, for example, the remaining amount of charge in the battery of the integrated mobile terminal device, the time information, and the alarm information, at stated intervals.

The timer 60 is driven under the control of the PDA unit 10 or the cellular phone unit 30 to enable the PDA unit 10 at intervals of, for example, one minute. As described above, the timer 60 is driven when the PDA unit 10 is disabled and the cellular phone unit 30 is switched off.

Figure 3:
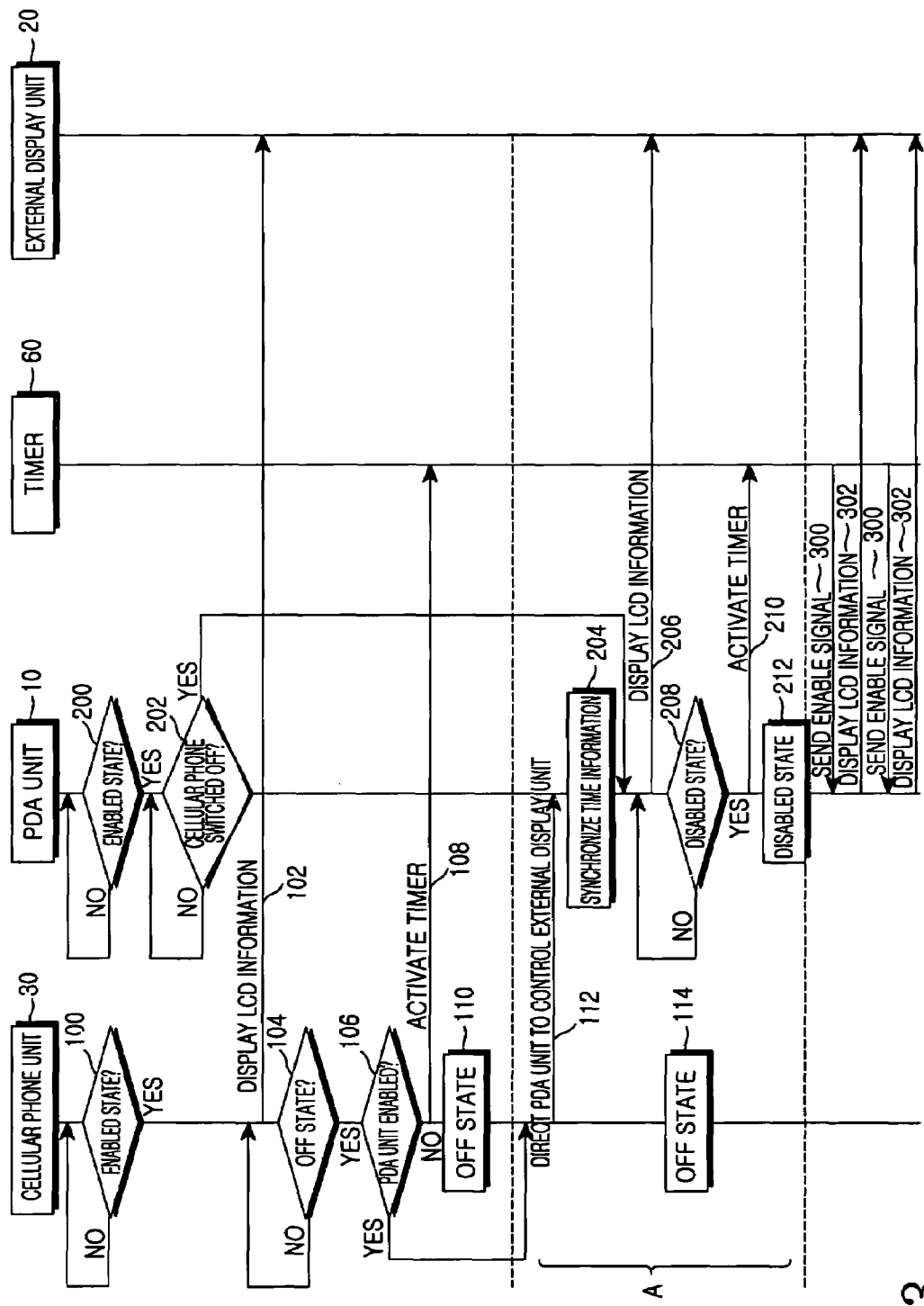
FIG. 3 is a flow chart illustrating a procedure for controlling an external display unit contained in an integrated mobile terminal device according to a preferred embodiment of the present invention.

FIG. 3 is a flowchart illustrating a procedure for controlling the external display unit of the integrated mobile terminal device according to a preferred embodiment of the present invention.

Referring to FIGS. 2 and 3, the cellular phone unit 30 determines whether it is enabled at step 100. If the integrated mobile terminal device is powered on, the cellular phone unit 30 can be enabled. Alternatively, the cellular phone unit 30 can be transitioned to an enabled state from an off state by the user. For example, the user of the integrated mobile terminal device can activate the cellular phone function by again enabling the cellular phone unit 30, after switching off the cellular phone unit 30 in order to use only the PDA function.

If the cellular phone unit 30 is enabled, it controls the external display unit 20 to display, for example, the antenna state bar, the remaining amount of charge in the battery of the integrated mobile terminal device, the time information, the SMS message, and the calling number, at step 102. The cellular phone unit 30 determines whether it is switched off at step 104. As noted above, the user may disable use only of the cellular phone function by switching off only the cellular phone unit 30. As long as the cellular phone unit is not switched off, it controls the external display unit 20 to display the display information. If the cellular phone unit 30 is directed to be powered off, it determines whether the PDA unit 10 is in the enabled state at step 106. If the PDA unit 10 is in a disabled state, the cellular phone unit 30 activates the timer 60 at step 108 and transitions to the off state at step 110. If the PDA unit 10 is in the enabled state, the cellular phone unit 30 directs the PDA unit 10 to control the external display unit 20. A period designated by "A" represents the case where the PDA unit 10 is in the enabled state when the cellular phone unit 30 is switched off.

Similarly, the PDA unit 10 determines whether it is enabled at step 200. If the integrated mobile terminal device is powered on, the PDA unit 10 is enabled. The PDA unit 10 can be enabled when the folder of the integrated mobile terminal device is opened by the user or its PDA function is activated. If the PDA unit 10 is enabled, it determines whether the cellular phone unit 30 is in the off state at step 202. If the cellular phone unit 30 is in the off state, the PDA unit 10 controls the external display unit 20 to display the display information at step 206. The PDA unit 10 may be directed to control the external display unit 20 by the cellular phone unit 30. That is, as mentioned above, if the cellular phone unit 30 is switched off under the state that the PDA unit 10 is in the enabled state, the cellular phone unit 30 directs the PDA unit 10 to control the external display unit 20. The PDA unit 10 then synchronizes the time information given by the cellular phone unit 30 with time information to be displayed on the external display unit 20. This is because the time information of the PDA unit 20 may be different from time information that has been displayed on the external display unit 20 by the cellular phone unit 30.

The PDA unit 10 determines at step 208 whether it is disabled. The PDA unit 10 is disabled when in the dormant state or when the folder of the integrated mobile terminal device is closed. If the PDA unit 10 is in the enabled state, it continuously controls the external display unit 20 to display, for example, the remaining amount of charge in the battery of the integrated mobile terminal device and the time information. If the PDA unit 10 is directed to be disabled, it activates the timer 60 at step 210 and transitions to the disabled state at step 212.

If the cellular phone unit 30 is switched off and the PDA unit 10 is disabled, the timer 60 is driven. Then the timer 60 enables the PDA unit 10 at intervals of, for example, one minute, at step 300. Hence, the PDA unit 10 controls the external display unit 20 to display the display information.

The respective operations of the PDA unit 10 and the cellular phone unit 30 are performed each time the PDA unit 10 and the cellular phone unit 30 are enabled. For instance, if the PDA unit 10 or the cellular phone unit 30 is again enabled after the PDA unit 10 is disabled and the cellular phone unit 30 is switched off, the PDA unit 10 or the cellular phone unit 30 carries out each corresponding operation.

If the cellular phone unit 30 is enabled by the activation of the timer 60 in the case where the PDA unit 10 is disabled and the cellular phone unit 30 is switched off, a constituent for radio communication, for instance, a radio frequency (RF) part is driven, causing excessive battery power consumption. Therefore, in the preferred embodiment of the present invention, the PDA unit 10 is periodically enabled.

While the PDA unit 10 is periodically enabled by the timer 60 when it is disabled and the cellular phone unit 30 is switched off according to the preferred embodiment of the present invention, it is apparent to those skilled in the art that it is possible to construct the cellular phone unit 30 to be periodically enabled by the timer 60.

As described above, since the external display unit of the integrated mobile terminal device is systematically controlled by the PDA unit and the cellular phone unit, a waste of power can be prevented. Moreover, the external display unit can be easily controlled irrespective of the enabled state of the PDA unit or the cellular phone unit of the integrated mobile terminal device.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An integrated mobile terminal device including an external display unit, and a personal digital assistant (PDA) unit and a cellular phone unit communicatively combined with one another, the device comprising:
a timer controlled by either the PDA unit or the cellular phone unit, for enabling the PDA unit at given time intervals upon activation of the timer;
wherein the cellular phone unit controls the external display unit in an enabled state, the cellular phone unit determines whether the PDA unit is in an enabled state when the cellular phone unit is directed to be switched off, the cellular phone unit directs the PDA unit to control the external display unit when the PDA is in the enabled state, and the cellular phone unit transitions to an off state after activating the timer when the PDA unit is in a disabled state; and
wherein the PDA unit controls the external display unit in response to a control command from the cellular phone unit, the PDA unit determines whether the cellular phone unit is in the off state when the PDA unit transitions to the enabled state from the disabled state, the PDA unit controls the external display unit when the cellular phone unit is in the off state, and the PDA unit transitions to the disabled state after activating the timer for enabling the PDA unit at given time intervals when the PDA unit is disabled.

2. The integrated mobile terminal device of claim 1, wherein the PDA unit receives time information from the cellular phone unit when the PDA unit is directed to control the external display unit by the cellular phone unit, and synchronizes the time information with time information to be displayed on the external display unit.

3. The integrated mobile terminal device of claim 1, wherein the cellular phone unit controls the external display unit to display at least one of an antenna state bar, the remaining amount of charge in a battery of the integrated mobile terminal device, time information, a SMS (Short Message Service) message, and a calling number.

4. The integrated mobile terminal device of claim 1, wherein the PDA unit controls the external display unit to display at least one of the remaining amount of charge in a battery of the integrated mobile terminal device, time information, and alarm information.

5. The integrated mobile terminal device of claim 1, wherein the cellular phone unit and the PDA unit are connected by an I2C bus using two lines of a clock line and a data line.

6. The integrated mobile terminal device of claim 5, wherein the I2C bus is connected to the external display unit so that the PDA unit and the cellular phone unit can provide display information.

7. The integrated mobile terminal device of claim 1, wherein the cellular phone unit is initialized to control the external display unit each time it is enabled.

8. A method for controlling an external display unit in an integrated mobile terminal device including the external display unit, and a personal digital assistant (PDA) unit and a cellular phone unit communicatively combined with one another, the method comprising the steps of:
controlling, by the cellular phone unit, the external display unit when the cellular phone unit is enabled, and determining, by the cellular phone unit, whether the PDA unit is in an enabled state when the cellular phone unit is directed to be switched off if the PDA unit is in a disabled state, activating, by the cellular phone unit, a timer for enabling the PDA unit at given time intervals, and transitioning the cellular phone unit to an off state; and
if the PDA unit is in the enabled state, directing, by the cellular phone unit, the PDA unit to control the external display unit and then the cellular phone unit is in an off state.

9. The method of claim 8, further comprising the step of controlling, by the PDA unit, the external display unit when the PDA unit is directed to control the external display unit by the cellular phone unit.

10. The method of claim 9, further comprising the step of disabling the PDA unit after activating the timer when the PDA unit is disabled.

* * * * *